(12) United States Patent
Hebert et al.

(10) Patent No.: US 6,267,333 B1
(45) Date of Patent: Jul. 31, 2001

(54) METHOD AND DEVICE FOR SECURING A CYLINDRICAL COMPONENT TO A MECHANICAL ASSEMBLY

(75) Inventors: Thomas K. Hebert, Groveland, MA (US); James D. Waterman, Newton, NH (US)

(73) Assignee: Agfa Corporation, Wilmington, MA (US)

( * ) Notice: Subject to any disclaimer, the term of this patent is extended or adjusted under 35 U.S.C. 154(b) by 0 days.

(21) Appl. No.: 09/407,379

(22) Filed: Sep. 28, 1999

(51) Int. Cl.[7] .................................. F16L 3/24; F16L 3/08
(52) U.S. Cl. ............................................ 248/72; 248/74.5
(58) Field of Search .............................. 248/72, 65, 74.5, 248/73, 49, 220.21, 220.22, 228.2, 67.5

(56) References Cited

U.S. PATENT DOCUMENTS

| | | | |
|---|---|---|---|
| 934,663 | * | 9/1909 | Folger .................................. 248/74.5 |
| 2,470,992 | * | 5/1949 | Kindorf et al. .......................... 248/72 |
| 2,875,969 | * | 3/1959 | Thompson ............................. 248/72 |
| 3,129,915 | * | 4/1964 | Budnick ................................ 248/72 |
| 3,437,742 | * | 4/1969 | Lindsey ................................ 248/65 |
| 3,902,931 | * | 9/1975 | Danciger et al. ....................... 248/72 |
| 4,131,257 | * | 12/1978 | Sterling ............................... 248/67.5 |
| 4,436,266 | * | 3/1984 | Gerding ................................ 248/65 |
| 4,516,296 | | 5/1985 | Sherman ............................... 24/279 |
| 4,588,152 | * | 5/1986 | Ruehl et al. ......................... 248/74.5 |
| 4,666,116 | * | 5/1987 | Lloyd ................................... 248/72 |
| 5,031,864 | * | 7/1991 | Krol .................................... 248/74.5 |
| 5,054,741 | * | 10/1991 | Ismert ................................. 248/74.5 |
| 6,021,982 | * | 2/2000 | Mangone, Jr. ....................... 248/74.5 |

\* cited by examiner

*Primary Examiner*—Ramon O. Ramirez
*Assistant Examiner*—Jerome A. DeLuca
(74) *Attorney, Agent, or Firm*—Robert A. Sabourin

(57) ABSTRACT

A cylindrical component is secured in a slot of a mechanical assembly. The slot is defined by two registration surfaces which meet at a vertex and a third surface which meets one of the registration surfaces. The securing method includes: placing the cylindrical component into contact with the two registration surfaces; applying a force $F_1$ against the cylindrical component causing compression of the cylindrical component into the two registration surfaces; and applying an anti-rotational force against the third surface to prevent redirection of the force $F_1$. One fastener which uses the above method includes: a surface which contacts the cylindrical component; a threaded engagement mechanism which secures the fastener to the mechanical assembly through a clearance hole in the fastener; and a protruded section which prevents rotation of the fastener by engagement with the third surface.

13 Claims, 3 Drawing Sheets

METHOD AND DEVICE FOR SECURING A CYLINDRICAL COMPONENT TO A MECHANICAL ASSEMBLY

BACKGROUND OF THE INVENTION

1. Field of the Invention

The invention relates generally to an improved method and device for securing a cylindrical component in any mechanical assembly in any industry, and more particularly, to a method and device for securing a cylindrical component in a precision web fed media transport system employed in an imagesetter or platesetter in the prepress printing industry.

2. Description of the Prior Art

There are many uses for cylindrical components in mechanical assemblies in various industries. For example, cylindrical shafts are used to drive or transfer power throughout machines, cylindrical rollers are used to guide web substrates, and cylindrical bearings are used to facilitate rotation of various machine elements. Quick, secure and easy installation of cylindrical components is desirable to save both time and money.

Often, precision is required in fastening cylindrical components onto mechanical assemblies. One prior art precision system for fastening a cylindrical component 12 onto a mechanical assembly 8 is illustrated in FIG. 1. Cylindrical component 12 is accurately positioned in a slot 19 with respect to first and second surfaces 14 and 16, respectively. A machining slot 18 is sometimes used when machining the surfaces 14 and 16 with a milling machine. Typically a pair of precision slots 19 are used to secure either end of the cylindrical component 12 and to align the cylindrical surface 9 of the cylindrical component 12 with other components (not shown) of the machine assembly 8.

The system 10 for securing the cylindrical component 12 includes a support 22 which is fastened onto the mechanical assembly 8 to secure the cylindrical component 12 between the support 22 and the surfaces 14 and 16. The support 22 includes two clearance holes or slots 2 for accepting two screws 20 which, in turn, are secured into threaded holes 4 in the mechanical assembly 8.

SUMMARY OF THE INVENTION

The present invention is directed towards a device and method for accurately securing cylindrical components onto mechanical assemblies in a manner which is easy, inexpensive and consumes little time. Both the removal and reinstallation of cylindrical components is simplified.

Specifically, a cylindrical component is secured in a slot of a mechanical assembly. The slot is defined by two registration surfaces which meet at a vertex and a third surface which meets one of the registration surfaces. The securing method includes: placing the cylindrical component into contact with the two registration surfaces; applying a force $F_1$ against the cylindrical component causing compression of the cylindrical component into the two registration surfaces; and applying an anti-rotational force against the third surface to prevent redirection of the force $F_1$. One fastener which uses the above method includes: a surface which contacts the cylindrical component; a threaded engagement mechanism which secures the fastener to the mechanical assembly through a clearance hole in the fastener; and a protruded section which prevents rotation of the fastener by engagement with the third surface.

BRIEF DESCRIPTION OF THE DRAWINGS

The aforementioned aspects and other features of the invention are described in detail in conjunction with the accompanying drawings, not necessarily drawn to scale, in which the same reference numerals are used throughout for denoting corresponding elements and wherein.

DETAILED DESCRIPTION OF THE PREFERRED EMBODIMENTS

Figure 1:
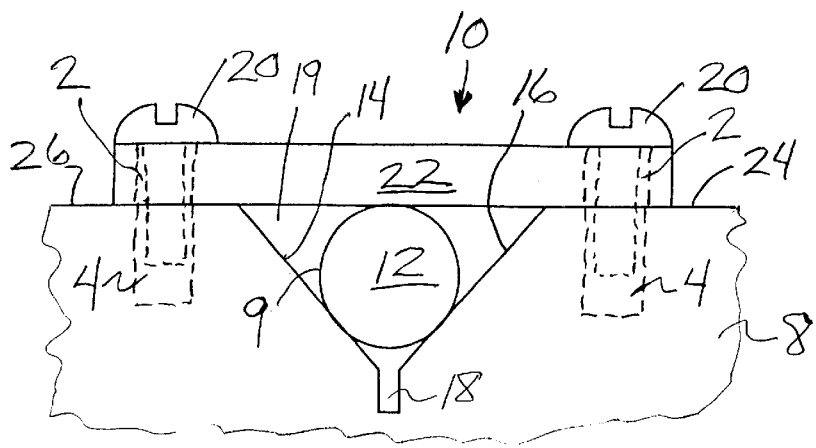
FIG. 1 is a cross-sectional view of a prior art system for clamping a cylindrical component onto a mechanical assembly.
Figure 2:
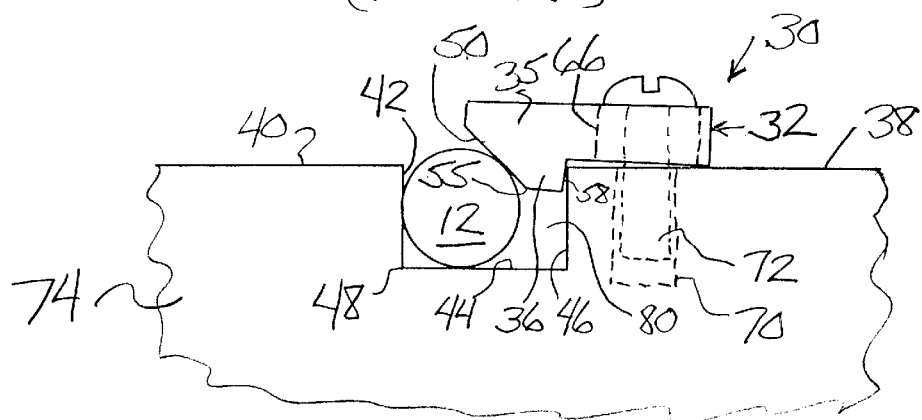
FIG. 2 is a cross-sectional view of an embodiment, according to the principles of the invention, of a system (including a clamp) for securing a cylindrical component into a slot on a mechanical assembly.

FIG. 2 is a cross-sectional view of an embodiment, according to the principles of the invention, of a system 30 for securing a cylindrical component 12 into a slot 80 on a mechanical assembly 74. The mechanical assembly 74 could be a part of any machine which uses cylindrical components, such as drive rollers, positioning rollers, cylindrical bearings, etc. In a preferred embodiment, the mechanical assembly 74 is part of an imagesetter or platesetter for making printing plates in the prepress printing industry.

The mechanical assembly 74 includes a slot 80 which is defined by two registration surfaces 42, 44 and a third (non-registration) surface 46. The registration surfaces 42, 44 are typically machined for accuracy within a given tolerance, so that the position of the cylindrical component 12 is registered when in contact with the surfaces 42, 44. The mechanical assembly 74 also includes surfaces 38 and 40, as well as a threaded hole 70 for receiving the screw 72.

Figure 3A:
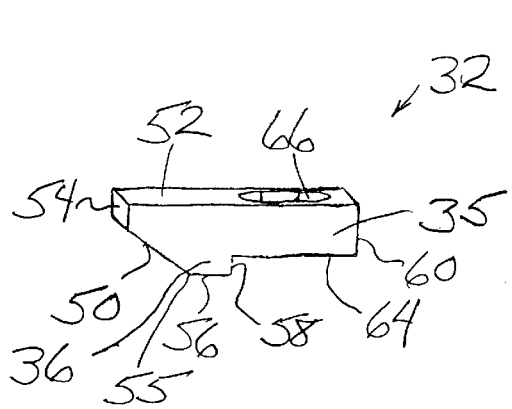
FIG. 3A is a top prespective view of the clamp used in FIG. 2.
Figure 3B:
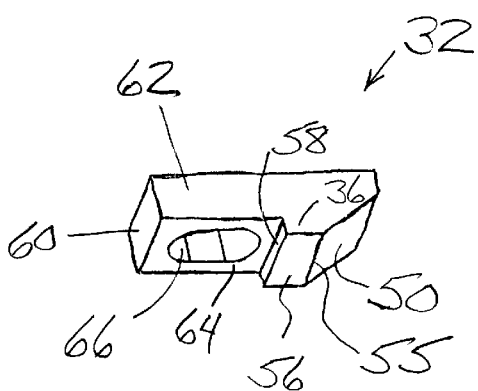
FIG. 3B is a bottom perspective view of the clamp used in FIG. 2.

The system 30 for securing the cylindrical component 12 into the slot 80 on the mechanical assembly 74 includes a clamp or fastener 32 and a single screw 72. The clamp 32, illustrated in FIG. 3A from a top perspective view and in FIG. 3B from a bottom perspective view, includes a top surface 52, a bottom surface 64 and a slot or clearance hole 66 therethrough for receiving a screw, bolt or other threaded fastening mechanism 72. The clearance hole 66 is preferably elongated to allow adjustment of the clamp 32 while being secured to the mechanical assembly 74 with the screw 72. The clamp 32 notably includes a beveled surface 50, as well as a protruded section 36 which at one end extends from the beveled surface 50 and, at another end, extends along a surface 58 from the bottom surface 64. The protruded section 36 shares sides 62 and 35 with the body of the clamp 32, and is furthered defined by a lower surface 56. The surfaces 54 and 60 define the ends of the body of the clamp 32. The edge 55 delineates the protruded section lower surface 56 from the beveled surface 50.

The system 30 operates as follows. An operator places the cylindrical component 12 into the slot 80 of the mechanical assembly 74. The operator then positions the clamp 32 so that both the beveled surface 50 is in contact with the cylindrical component 12, and the surface 58 of the protruded section 36 is in contact with the third surface 46 of the mechanical assembly 74 (see in FIG. 2). The operator tightens the screw 72 causing the clamp 32 to mate with the mechanical assembly 74 while simultaneously compressing the beveled surface 50 onto the cylindrical component 12. The surface 50 could be curved or otherwise designed—it need not be beveled as long as it can effectively be used to apply a force against the cylindrical component 12 when the clamp 32 is tightened by screw 72.

Figure 4:
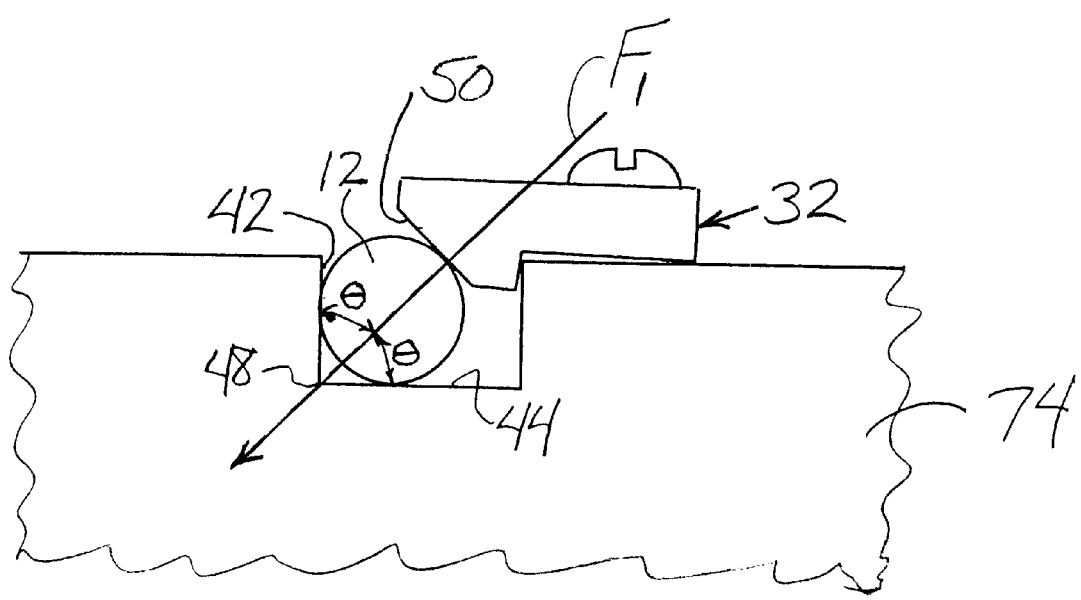
FIG. 4 is a side view illustrating the clamping force of the system of FIG. 2.
Figure 5:
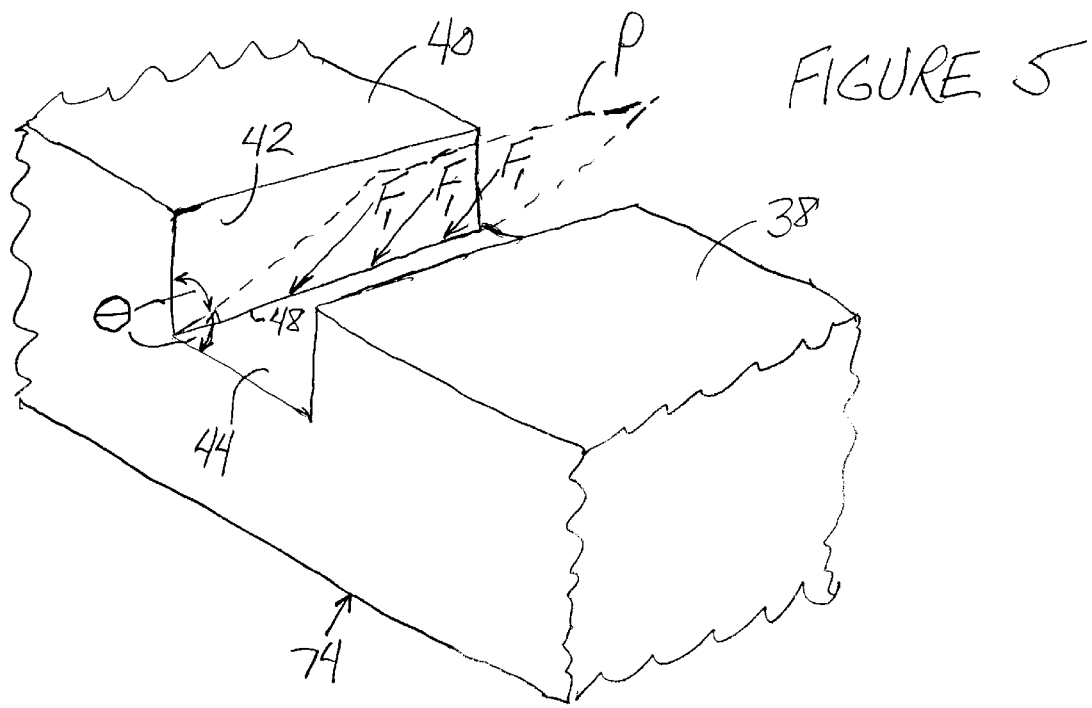
FIG. 5 is a partial perspective view of part of the mechanical assembly of FIG. 2, illustrating the clamping force of the system of FIG. 2.
Figure 6:
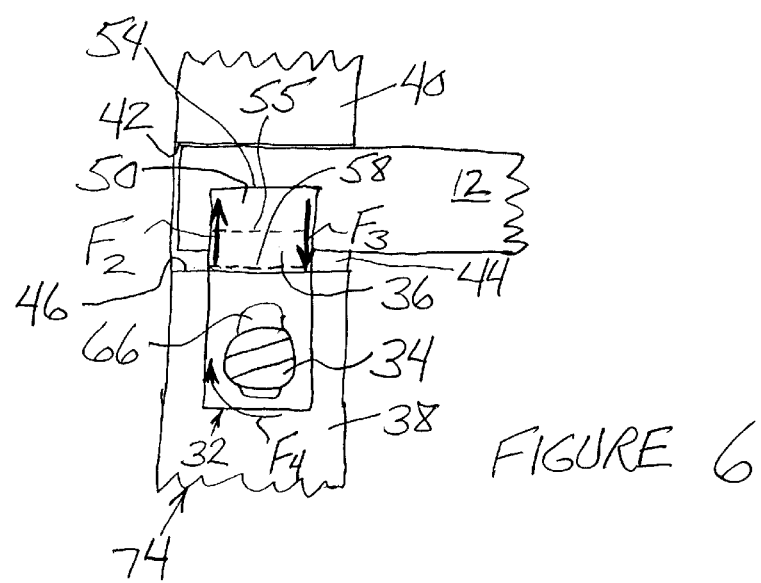
FIG. 6 a top view of the system of FIG. 2.

As the operator is tightening the screw 72, at least two different forces are applied to the clamp 32. These forces are illustrated in view of FIGS. 4, 5 and 6. A linear force $F_1$ is applied from the beveled surface 50 of the clamp 32 to the cylindrical component 12 as illustrated in FIGS. 4 and 5. In one embodiment, the force $F_1$ is substantially uniformly applied in a plane P which intersects the vertex 48. In another embodiment, the force $F_1$ is substantially uniformly applied in a plane which bisects an angle 2Θ between the two registration surfaces 42 and 44. In yet another embodiment, the force $F_1$ is substantially uniformly applied in a plane which intersects one of the registration surfaces 42 or 44. In still another embodiment, the force is applied linearly without being dispersed throughout a plane. In each case above, the force $F_1$ originates from the tightening of the clamp 32 and is applied and directed from the beveled surface 50 to the cylindrical component 12.

In addition to the linear force $F_1$, a rotational force $F_4$ is transferred to the clamp 32 when tightening the screw 34. Vector components $F_2$ and $F_3$ of this radial force are illustrated in FIG. 7. The engagement of the back surface 58 of the protruded section 36 with the third surface 46 of the slot 80 prevents the clamp 32 from rotating. Conversely when loosening the screw 34, a rotational force in the opposite direction of $F_4$ is transferred to the clamp 32. Again, the engagement of the back surface 58 of the protruded section 36 with the third surface 46 of the slot 80 prevents the clamp 32 from rotating. This anti-rotational feature of the clamp 32 is notable in allowing one-handed installation and removal of the clamp 32 from the mechanical assembly 74, thus freeing the operator's other hand. Further, the protruded section 36 ensures an interference of adjacent surfaces to maintain the assembly in compression.

The clamp 32 is tremendously versatile since it can be used on cylindrical components 12 having different diameters. Advantageously, the clamping system 30 as claimed and described herein requires fewer parts (one screw versus two), smaller parts and less material (clamp 32 versus support 22), all resulting in cost savings. Also, the general shape of the clamp is suited to mass production methods such as extrusion, powder metal molding or die casting to produce an inexpensive part.

The above described embodiments are merely illustrative of the present invention and represent a limited number of the possible specific embodiments that can provide applications of the principles of the invention. Numerous and varied other arrangements may be readily devised in accordance with these principles by those skilled in the art in keeping with the invention as claimed.

What is claimed is:

1. A method for securing a cylindrical component in a slot of a mechanical assembly, the slot defined by two planar registration surfaces which meet at a vertex and a third planar surface which meets one of the registration surfaces, the method comprising:

placing the cylindrical component into contact with the two registration surfaces;

placing a securing surface of a clamp into contact with the cylindrical component;

fastening the clamp to the mechanical assembly by engaging a single, threaded, fastening mechanism through a single clearance hole in the clamp and into a threaded hole in the mechanical assembly, said fastening causing a force $F_1$ to be applied against the cylindrical component causing compression of the cylindrical component into the two registration surfaces; and simultaneous with the fastening, engaging a protruded section of the clamp with the third surface, causing an anti-rotational force to be applied against the third surface to prevent redirection of the force $F_1$, said protruded section being wedged between the third surface and the cylindrical component.

2. The method of claim 1 wherein said two registration surfaces are orthogonal to each other at the vertex, and said third surface is orthogonal to said one of the registration surfaces.

3. The method of claim 1 wherein said mechanical assembly is a web fed media transport system employed in an imagesetter or a platesetter.

4. The method of claim 1 wherein the force $F_1$ is directed in a plane which intersects the vertex.

5. The method of claim 1 wherein the force $F_1$ is directed in a plane which bisects an angle formed between the two registration surfaces.

6. A fastener for securing a cylindrical component into a slot in a mechanical assembly, the slot defined by two planar registration surfaces which meet at a vertex and a third planar surface which meets one of the registration surfaces, the slot accepting the cylindrical component in contact with said two registration surfaces, the fastener comprising: a surface which contacts the cylindrical component; a threaded engagement mechanism which secures the fastener to the assembly through a single clearance hole in the fastener and into a threaded hole in the mechanical assembly; and a protruded section which ensures interference and prevents rotation of the fastener by engagement with the third surface, said protruded section being wedged between the third surface and the cylindrical component.

7. The fastener of claim 6 wherein said two registration surfaces are orthogonal to each other at the vertex, and said third surface is orthogonal to said one of the registration surfaces.

8. The fastener of claim 6 wherein said mechanical assembly is a web fed media transport system employed in an imagesetter or a platesetter.

9. The fastener of claim 6 wherein said surface which contacts the cylindrical component is beveled.

10. A system for securing a cylindrical component into a mechanical assembly, the system comprising:

a slot in the mechanical assembly defined by two planar registration surfaces which meet at a vertex and a third planar surface which meets one of the registration surfaces, the slot accepting the cylindrical component in contact with said two registration surfaces; and a clamp comprising (i) a protruded section which extends into the slot, ensures interference and prevents rotation of the clamp by engagement with the third surface, said protruded section being wedged between the third surface and the cylindrical component, and (ii) a surface which contacts the cylindrical component, wherein said clamp is mounted by a single, threaded, fastening mechanism through a clearance hole in the clamp and into a threaded hole in the mechanical assembly to secure the clamp to the mechanical assembly.

11. The system of claim 10 wherein said two registration surfaces are orthogonal to each other at the vertex, and said third surface is orthogonal to said one of the registration surfaces.

12. The system of claim 10 wherein said mechanical assembly is a web fed media transport system employed in an imagesetter or a platesetter.

13. The system of claim 10 wherein said surface which contacts the cylindrical component is beveled.

\* \* \* \* \*